United States Patent
Moizio

(10) Patent No.: US 6,741,750 B1
(45) Date of Patent: May 25, 2004

(54) MOTION ARTIFACT CORRECTION IN EXPOSURE SYSTEMS

(75) Inventor: Frank J. Moizio, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/408,096

(22) Filed: Sep. 27, 1999

Related U.S. Application Data

(60) Provisional application No. 60/102,499, filed on Sep. 30, 1998.

(51) Int. Cl.$^7$ ................................................ G06K 9/40
(52) U.S. Cl. ....................................................... 382/254
(58) Field of Search .......................... 382/254; 359/237, 359/241, 242, 244, 245, 263, 275, 290, 291, 298; 355/18, 32, 35, 40, 43, 54, 67, 71, 77; 702/85, 90, 94, 95, 104, 106, 112; 250/231.13, 231.16–231.18, 233, 236; 324/207.11–207.12, 207.22, 207.25; 341/3–4, 111, 120

(56) References Cited

U.S. PATENT DOCUMENTS

| | | |
|---|---|---|
| 4,445,128 A | 4/1984 | Dolan et al. |
| 5,493,385 A | 2/1996 | Ng |
| 5,701,185 A * | 12/1997 | Reiss et al. ............... 358/471 |
| 6,163,363 A * | 12/2000 | Nelson et al. .............. 355/32 |
| 6,415,237 B1 * | 7/2002 | Moizio et al. ............. 702/104 |

FOREIGN PATENT DOCUMENTS

| | | |
|---|---|---|
| EP | 0 616 266 A2 | 9/1994 |
| EP | 0 818 917 A2 | 1/1998 |
| EP | 0 821 515 A2 | 1/1998 |
| JP | 10003188 | 1/1998 |

* cited by examiner

Primary Examiner—Jose L. Couso
(74) Attorney, Agent, or Firm—Charles A. Brill; Wade James Brady, III; Frederick J. Telecky, Jr.

(57) ABSTRACT

A system and method for correcting spatial banding artifacts in print images. The system includes: a light source, a spatial light modulator, a transport system for transporting a substrate on a carrier allowing the spatial light modulator to form an image on the substrate; a first encoder (26) that attaches to the carrier and senses its movement; a second encoder (36) attached to the drive circuit (34) of the transport system to sense operation of the drive circuit (34); a first circuit (20) that receives the information from the first encoder and adjusts operation of the spatial light modulator; and a second circuit (30) that receives the signal from the second encoder and adjusts operation of the drive circuit to coordinate movement of the substrate and the image to avoid artifacts. The method for establishing this system is also disclosed.

2 Claims, 1 Drawing Sheet

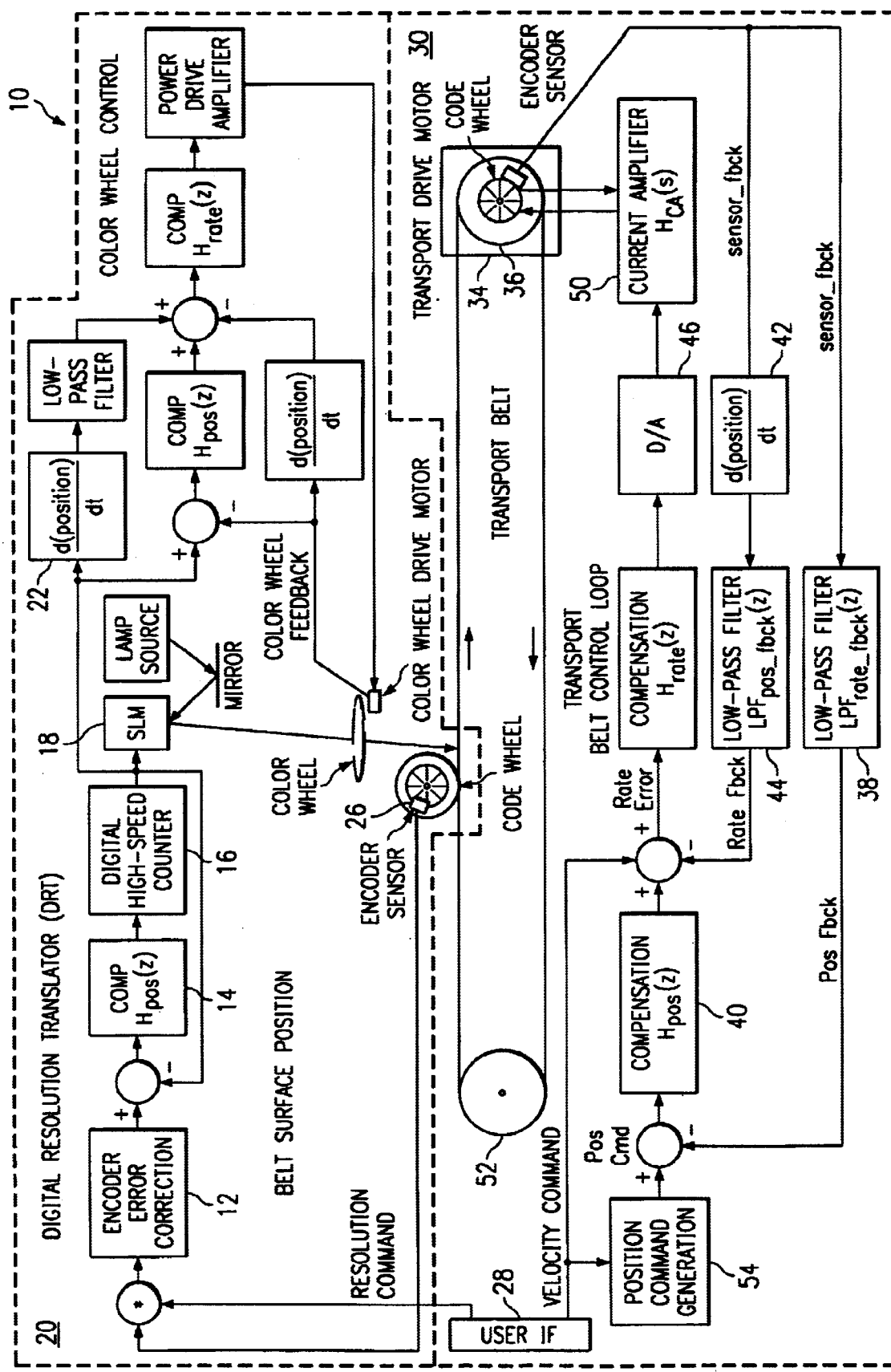

MOTION ARTIFACT CORRECTION IN EXPOSURE SYSTEMS

This application claims priority under 35 U.S.C. § 119(1) of provisional application number 60/102,499 filed Sep. 30, 1998.

BACKGROUND OF THE INVENTION

1. Field of the Invention

This invention relates to exposure systems using a scanner, more particularly to those systems having a transport system.

2. Background of the Invention

Traditional photofinishing systems use a scanning system to transfer the images to photographic paper. The scanning system typically writes a line or pixel of an image at a time. A transport system then moves the paper or other substrate and the scanning system writes the next line. However, the scanning system and the transport system currently operate independently from each other. This can cause artifacts in the image.

The most common artifact is what is referred to as 'banding.' This is caused by position misplacement where position of the completed image has unintended bands of colors or shades of gray. Individual lines or pixel components of the image have not been placed onto the substrate in the proper position relative to previously placed lines or pixel components of the image. This creates undesired color and or intensity variations know as motion artifact banding. Assembly of a competed image requires the accurate position placement of each of the line or pixel components, which can represent different colors and intensities, to produce the final desired image. The repetition of the line or pixel components should occur at the same place on the substrate, but do not necessarily have to occur at the same time. This inaccuracy of position overlap, not the time lapse between the number of times unique line or pixel components are imaged onto the substrate, causes the banding artifact if the registration between the line or pixel components is not accurate.

Image registration fails when the motion of the scanner does not match the motion of the transport system. The human eye detects the banding artifacts most readily when at a spatial frequency of 0.05 cycle/mm to 1 cycle/mm. These are spatial frequency errors that occur due to some disturbance of the motion of the substrate at some frequency.

For example, a disturbance unique to the substrate and not the scanner, which occurs at 10 Hz, or 10 times every second, translates into a 0.05 cycle/mm spatial banding artifact in the image for a system having a speed of 8 inch/sec. The calculation is as follows:

$$\frac{10 \text{ cycles}}{\text{sec}} * \frac{1 \text{ sec}}{8 \text{ inches}} * \frac{1 \text{ inch}}{25.4 \text{ mm}} = \frac{.05 \text{ cycles}}{\text{mm}}$$

These types of banding artifacts typically result from both DC speed inaccuracies associated with independent control of the transport system and the scanner. Control of each of these systems can have unique DC and AC position and speed errors due to many factors such as mechanical tolerances associated with the feedback transducer, errors in the feedback transducers, errors in the motors (cogging or torque ripple), and errors in drive train tolerances.

Therefore, a method is needed that allows the rate of the scanning system and the transport system for image exposure systems to be more closely coupled to eliminate image artifacts such as banding.

SUMMARY OF THE INVENTION

One aspect of the invention is a photofinishing system that coordinates movement of an image created by a spatial light modulator and movement of the substrate upon which that image is to be imaged. The system has a transport S system for moving the substrate, with an encoder wheel attached to the carrier in the transport system. The encoder wheel generates a signal dependent upon the position of the carrier. A second encoder is attached to the drive motor of the transport system and produces a second signal dependent upon the control of the drive circuit. Two separate circuits are used to monitor and adjust operation of the system based upon these signals.

It is an advantage of the invention in that it produces higher quality images with no banding artifacts.

It is a further advantage of the invention in that either one of the two circuits can be used to improve image quality, or they can be used simultaneously.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 is a block diagram schematic of one embodiment of the invention.

DETAILED DESCRIPTION OF THE PREFERRED EMBODIMENTS

The use of spatial light modulators for printing applications allow for a much different print process for photofinishing than previously used. Typical photofinishing systems use a laser scanning system that scan the image onto the photographic paper or other substrate in a rasterized fashion, line by line. Spatial light modulators having an array of elements, where each element corresponds to a pixel on an image, expose entire lines at the same time.

For discussion purposes, a reflective spatial light modulator is assumed. However, no limitation of the invention to reflective spatial light modulators is intended. Any array of individually addressable elements that can form images on a photofinishing substrate can use the invention. Further, the photofinishing substrate in this example is photosensitive paper. However, any type of photofinishing substrate could receive the image from the spatial light modulator.

A photofinishing system 10 in accordance with one embodiment of the invention is shown in FIG. 1. For discussion purposes, the control of this system 10 has been divided into two discrete parts, an image system control loop 20 and a transport system control loop 30.

Generally, the image system control loop 20 will provide coordinated control between the motion of the transport belt 52 and the production of the image by the spatial light modulator (SLM) 18. The code wheel sensor wheel, or encoder, 26 detects the motion of the transport belt 52. For discussion purposes, the code wheel sensor will be referred to as an encoder. Any type of transducer that yields position or rate information is an encoder. The image control system receives the belt surface position signal and performs several operations with it to control operation of the SLM 18.

The first operation corrects for the encoder error at encoder error correction circuit 12. Encoder error occurs due to problems with the eccentricity of the encoder wheel itself. This typically results from a non-perfect centering of the wheel, causing the wheel to spin in a slightly oval path. This error causes the signal pulses created by the roller to either spread across the time period, or to occur closer together in time than desired, hence, yielding inaccurate information about the position of the transport.

Over regions of the print, the encoder eccentricity error accumulates error across the pixels of the image, if not removed. Pixels will overlap and create banding streaks in the process direction, the direction in which the substrate moves. The amount of banding due to the eccentricity of the encoder will depend on the quality of the encoder mount as well as the actual encoder itself. The eccentricity must be minimized through electronic correction or costly mechanical mounting techniques.

The closed loop operation of the compensation circuit 14 eliminates the high frequency noise emanating from the encoder. It performs low pass filtering on the incoming signal eliminating the high frequency noise. On initialization, the high-speed digital counter 16 has a preset value that translates into an output signal being produced to operate the SLM 18. The preset value determines the number of pulses from the encoder wheel 26 that will cause the motion control signal to operate the SLM 18 and thereby image the next line of print.

This signal commanding SLM 18 controls the connection between the position of the substrate on the transport belt 52 in the transport system 30 and the image produced by the SLM 18 to maintain proper registration. The encoder resolution (number of bits in the encoder output signal) is 11 bits (2048 codes). The desired image resolution is 360 dots per inch. The roller to which the encoder wheel attaches has a 2-inch diameter. The input frequency is the frequency received by the image control system from the encoder; the output frequency is produced by the control system, and the encoder eccentricity equals the spatial frequency at which errors occurred. For the given encoder resolution (2048), desired image resolution (360 DPI), and encoder wheel diameter (2 inches) the table below represents the required relationships to allow the SLM to be positionally slaved to the transport.

| Encoder Frequency (Hz) | SLM Frequency (Hz) | Transport Speed (Inches/sec) | Control System Static Transfer Function |
| --- | --- | --- | --- |
| 325.9 | 360 | 1 | 1.104466167 |
| 651.9 | 720 | 2 | 1.104466167 |
| 1303.8 | 1440 | 4 | 1.104466167 |
| 2607.6 | 2880 | 8 | 1.104466167 |

The table above also illustrates a principle function of the control loop, which is to provide a non-integer scale factor from the encoder output to the SLM input.

The control loop function also must provide low pass filtering and closed loop bandwidth of approximately 300 Hz with minimal phase loss. The control loop function can be achieved by techniques and apparatus as set forth in U.S. patent application Ser. No. 08/899,969, entitled "Digital Resolution Translator," but is not limited solely to that implementation.

The invention improves image registration accuracy for any given transport and allows the transport system greater speed error from nominal operational speed while still maintaining registration accuracy of the image. This embodiment of the invention allows significant performance benefits from transport disturbances that occur in the 10 to 200 Hz frequency range. At a transport speed of 8 inches/second this frequency range can also be represented as 0.05 cycles/mm to 1 cycle/mm. Studies have shown that the greatest human perceptibility of banding image errors falls into the 0.5 cycle/mm and the 1 cycle/mm range. This embodiment of the invention is capable of significantly minimizing transport errors and thereby image banding errors in the critical frequency range of human perception.

One thing that should be noted is that the system is assumed to have some type of carrier, such as the transport belt 52, upon which the substrates ride. In some applications, such as web fed printers, the transport belt 52, or carrier, and the substrate would be one and the same. For purposed of this invention, the carrier will refer to either the transport belt or the web fed substrate itself.

The image control system 20 as discussed above has many similarities to a similar system disclosed in more detail in U.S. patent application Ser. No. 60/070,128. However, any type of image control system that coordinates the motion of the carrier and therefore the substrate, with the imaging of the substrate can be used to implement the invention. Indeed, the image control system 20 and the transport control system 30 can be implemented together as shown, or separately.

The transport control system 30 uses similar techniques as those discussed above. However, in general terms the transport control system adjusts the speed of the transport system to more closely match the desired speed by comparing the actual speed with the desired speed in a feedback loop.

The encoder sensor wheel 36 measures the actual speed. This signal then passes through two low pass filters. The first low pass filter 44 provides a rate feedback signal, which will be subtracted from other signals generated. The signal from the encoder sensor wheel 36 passes through a second low pass filter 38 and is subtracted from a position command generated at 54, which is produced from a velocity signal provided at the user interface 28. The compensation circuit 40 then produces a compensation signal which has the rate feedback signal 44 subtracted from it.

A second compensation circuit 48 then converts the positional compensation signal to a rate compensation signal. The rate compensation signal, up to this point a digital signal, must then be converted to an analog signal at 46. The resulting analog signal is then used by the motor current control 50 to control the motor. The end result is an adjustment of the transport system drive motor to more closely couple the actual speed of the carrier with the desired speed.

As mentioned above, either one of these control systems can be used together or independently to improve the image quality of a photofinishing system. Additionally, the blocks in the diagram are shown as being separate functional circuits. However, all the functions of these could be included in one circuit or even in one processor. No limitation on the implementation of the invention is intended nor should be implied.

Thus, although there has been described to this point a particular embodiment for a method and structure for a photofinishing control system, it is not intended that such specific references be considered as limitations upon the scope of this invention except in-so-far as set forth in the following claims.

What is claimed is:

1. Photofinishing system with improved control, comprising:

a. a light source;
b. a spatial light modulator for modulating light from said source into a print image;
c. a transport system for transporting a substrate on a carrier past said spatial light modulator such that said substrate receives said print image;
d. a first encoder sensor attached to said carrier operable to sense movement of said carrier and to generate an image position signal;
e. a second encoder sensor attached to a drive circuit of said transport system operable to sense operation of said drive circuit and to generate a motor control signal;
f. a first circuit operable to receive said image position signal and adjust operation of said spatial light modulator such that said spatial light modulator modulates said print image based upon position of said substrate and desired resolution; and
g. a second circuit operable to receive said motor control signal and to adjust operation of said drive circuit to coordinate movement of said substrate with said modulation of said print image.

2. A method for improving registration of a photofinishing image comprising the steps of:
a. attaching a first encoder to a carrier that carries print substrates in a transport system;
b. attaching a second encoder to a drive circuit of said transport system;
c. generating an image position signal from said first encoder;
d. generating a motion control signal from said second encoder;
e. receiving said image position signal from said first encoder and adjusting operation of a spatial light modulator based upon position of said print substrates relative to said spatial light modulator;
f. receiving said motion control signal from said second encoder and adjusting operation of said drive circuit to coordinate control of said drive circuit with position of said substrate; and
g. modulating light with said spatial light modulator to generate a print image upon said substrate.

* * * * *